United States Patent
Cortadella et al.

(10) Patent No.: US 7,634,749 B1
(45) Date of Patent: Dec. 15, 2009

(54) SKEW INSENSITIVE CLOCKING METHOD AND APPARATUS

(75) Inventors: Jordi Cortadella, Gelida (ES); Alex Kondratyev, Campbell, CA (US); Luciano Lavagno, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 289 days.

(21) Appl. No.: 11/097,514

(22) Filed: Apr. 1, 2005

(51) Int. Cl.
*G06F 17/50* (2006.01)

(52) U.S. Cl. .................. 716/10; 716/8; 716/9; 716/11; 327/153; 327/155; 327/202; 713/400; 714/731

(58) Field of Classification Search ............... 716/8–11; 327/153, 155, 202; 713/400; 714/731
See application file for complete search history.

(56) References Cited

U.S. PATENT DOCUMENTS

| | | | | |
|---|---|---|---|---|
| 3,591,856 | A * | 7/1971 | Kalb | 327/204 |
| 4,072,869 | A * | 2/1978 | Gillow | 327/202 |
| 4,701,922 | A * | 10/1987 | Kuboki et al. | 714/731 |
| 5,072,132 | A * | 12/1991 | Samaras et al. | 327/202 |
| 5,124,572 | A * | 6/1992 | Mason et al. | 327/145 |
| 5,133,064 | A * | 7/1992 | Hotta et al. | 713/375 |
| 5,264,738 | A * | 11/1993 | Veendrick et al. | 327/203 |
| 5,317,202 | A * | 5/1994 | Waizman | 327/156 |
| 5,418,932 | A * | 5/1995 | Watabe et al. | 713/500 |
| 5,485,112 | A * | 1/1996 | Greenberg et al. | 327/198 |
| 5,710,711 | A * | 1/1998 | Cheng et al. | 716/20 |
| 5,748,487 | A * | 5/1998 | Sawasaki et al. | 716/1 |
| 6,185,720 | B1 * | 2/2001 | Banik | 716/2 |
| 6,226,774 | B1 * | 5/2001 | Sawasaki et al. | 716/1 |
| 6,301,553 | B1 * | 10/2001 | Burgun et al. | 703/15 |
| 6,477,684 | B1 * | 11/2002 | Sanghani | 716/4 |
| 6,798,248 | B2 * | 9/2004 | Hazucha et al. | 326/93 |
| 6,943,610 | B2 * | 9/2005 | Saint-Laurent | 327/295 |
| 7,028,273 | B2 * | 4/2006 | Kanamaru et al. | 716/2 |
| 7,240,249 | B2 * | 7/2007 | Buchmann et al. | 714/700 |
| 2004/0068640 | A1 * | 4/2004 | Jacobson et al. | 712/220 |
| 2005/0155001 | A1 * | 7/2005 | Kinoshita et al. | 716/2 |

OTHER PUBLICATIONS

Amde et al., "Asynchronous on-chip networks", Computers and Digital Techniques, IEE Proceedings, vol. 152, issue 2, Mar. 2005 pp. 273-283.*

Cortadella et al., "A concurrent model for de-synchronization", in Proceedings of the International Workshop on Logic Synthesis, pp. 294-301, 2003.*

Chinnery, D. et al. "Closing the Gap Between ASIC and Custom" Title page, copyright page, table of contents, pp. 13-15, 57-100, 187-223, and 347-360, Kluwer Academic Publisher Group, Norwell, MA.

Cortadella, J. et al. "A Concurrent Model for Desynchronization" Proceedings of the International Workshop on Logic Synthesis (IWLS '03), Laguna Beach, CA, May 28-30, 2003, 10 pgs.

(Continued)

*Primary Examiner*—Naum B Levin
(74) *Attorney, Agent, or Firm*—Vista IP Law Group, LLP

(57) ABSTRACT

A method of designing a skew insensitive circuit is performed by designing a synchronous circuit including flip-flops and combinatorial logic and, for each flip-flop, inserting logic gates to receive a skewed clock signal and to locally derive non-overlapping clock phases from the skewed clock signal.

18 Claims, 6 Drawing Sheets

OTHER PUBLICATIONS

Hagihara, Y. et al. "A Skew-Tolerant Design Scheme for Over 1-GHz LSIs" Proceedings of the 26th European Solid-State Circuits Conference (ESSCIRC '00), Stockholm, SE, Sep. 19-21, 2000, pp. 415-418.

Kourtev, I.S. et al. "Timing Optimization Through Clock Skew Scheduling" Title page, copyright page, table of contents, list of tables, Chapters 4-7, Klumer Academic Publishers, Norwell, MA., 1968.

Liu, X. et al. "Maximizing Performance by Retiming and Clock Skew Scheduling" Proceedings of the 36th ACM/IEEE Conference on Design Automation (DAC '99), New Orleans, LA, Jun. 21-25, 1999, pp. 231-236.

* cited by examiner

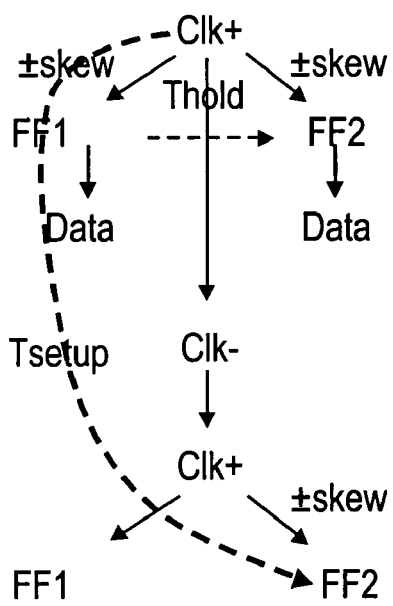
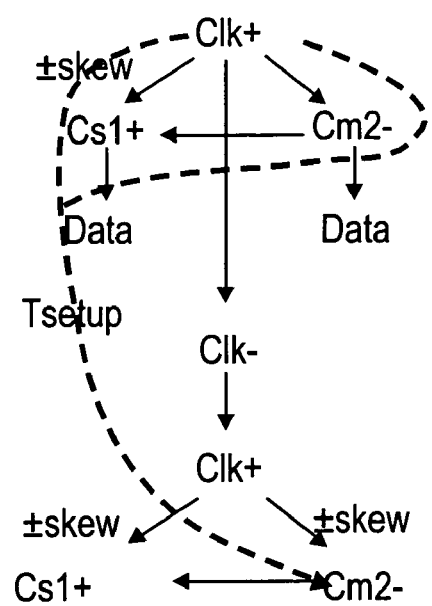
FIG. 7A          FIG. 7B

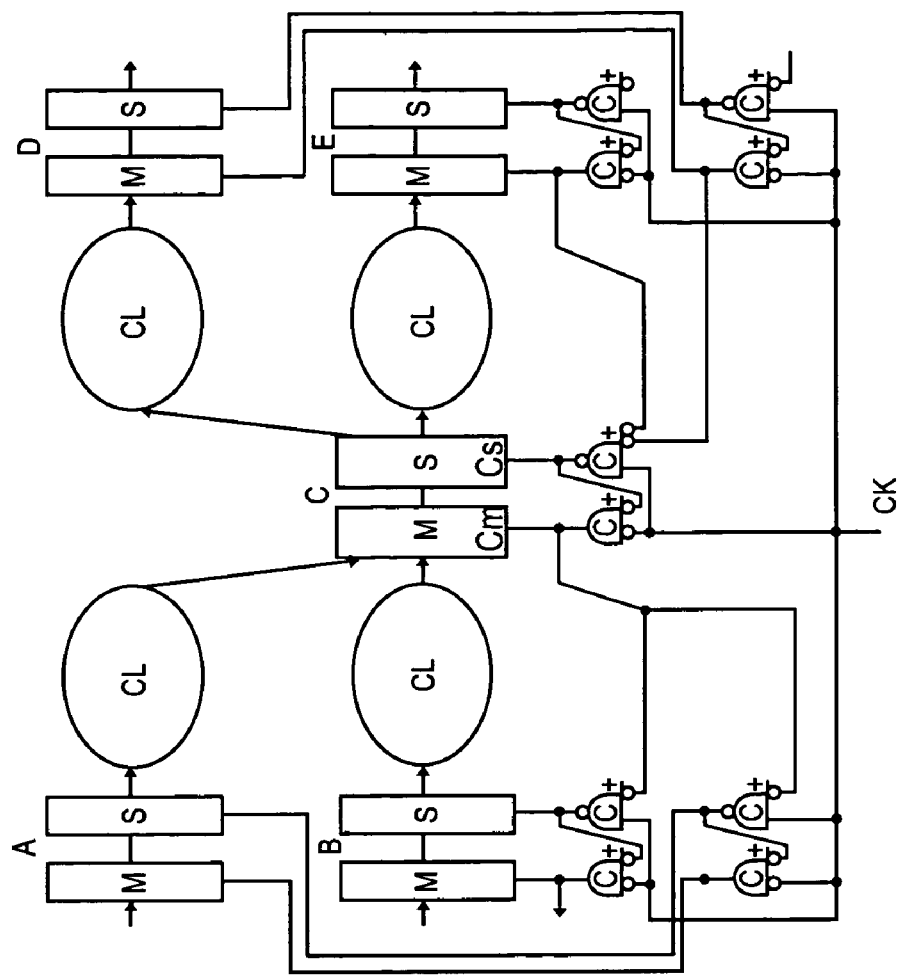
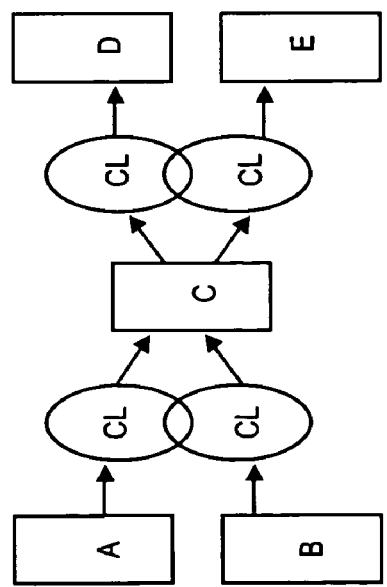
FIG. 8B
FIG. 8A

SKEW INSENSITIVE CLOCKING METHOD AND APPARATUS

COPYRIGHT NOTICE

A portion of the disclosure of this patent document contains material which is subject to copyright protection. The copyright owner has no objection to the facsimile reproduction by anyone of the patent document or patent disclosure, as it appears in the U.S. Patent and Trademark Office patent file or records, but otherwise reserves all copyrights whatsoever.

FIELD OF THE INVENTION

The skew-insensitive clocking (SIC) method is related to the field of microelectronic digital circuits.

BACKGROUND

Most digital circuits have a single or a few clock signals that determine the pace at which the functional units of the system work to guarantee proper communication among them. These circuits are called synchronous. The clock signal of a synchronous circuit is characterized by a high load capacitance and, thus, the propagation of the transitions of the clock signal may take a significant amount of time, if not done properly. The time difference among the arrival of the clock at different points of the circuit is known as clock skew. For a correct functioning of a synchronous circuit, clock skew is maintained within a certain small interval.

As the number of gates in digital circuits grows, the reduction of the clock skew becomes a difficult problem to solve. Circuits typically have complex clock networks aimed at the fast propagation of clock transitions with a small skew. Due to the high capacitance of the clock signal, these networks consume a significant amount of energy.

For example, several different schemes can be used to maintain a small skew when distributing clock signals in a circuit. A method that implements H-trees is used in full-custom layout. This method uses an H-shaped wiring scheme so that all paths from the clock driver to the end points of the signal have a similar length. Buffering trees, which are used in synthesis, placement and routing-based design flows, can be generated by synthesis tools in order to achieve a pre-determined maximum skew between any pair of flip-flop clock edges. Zero-skew routing is a technique used in place-and-route tools, which artificially lengthens some paths, in a bottom-up fashion from the flip-flops, in order to equalize path lengths. It is most effective when coupled with buffering. Techniques based on clock skew scheduling rely on an accurate timing analysis of the system and a schedule of fine-grain operations (e.g. gate-level operations) to maintain an acceptable skew of the clock in different points of the circuit.

However, each of these solutions faces the clock skew problem at different levels. In these previous examples, the clock skew problem is tackled by either reducing it by means of physical techniques, or by accurately calculating it and scheduling operations in such a way that the skew does not affect the correctness of synchronization.

SUMMARY OF THE INVENTION

A synchronous circuit with a single clock and D-type flip-flops is designed using a skew insensitive clocking (SIC) method. Each flip-flop of the design is replaced by two latches. One of the latches is transparent with the high level of the clock, whereas the other is transparent with the low level. One clock controller is inserted for each latch, between the clock signal and the control signal of the latch. For registers with multiple fanout, the method collects acknowledge signals from a controller for each fanout latch. For multiple clock signals, controllers that can multiply or divide frequencies of acknowledge signals are used. Each controller can be optimized based on a timing analysis, by removing inputs whose arrival time under a given timing margin do not have a significant impact on the time of transitions at controller outputs. Therefore, the method provides a way to optimize local controllers based on static timing analysis. The method also provides a way to implement local controllers for generating race-free clocks. The SIC method eliminates the problem of hold constraint violations due to the clock skew. Even though the clock signals may be distributed over the circuit, a race-free clocking scheme is guaranteed with this method, regardless of the skew of the clock.

BRIEF DESCRIPTION OF THE DRAWINGS

FIGS. 7(a) and 7(b) show examples of timing diagrams for a synchronous circuit design before and after using the method of FIG. 1.

FIGS. 8(a) and 8(b) show examples of applying the method of FIG. 1 to a non-linear pipeline circuit design.

DETAILED DESCRIPTION

A skew insensitive clocking (SIC) method provides a way of designing a circuit that is insensitive to skewed clock signals. With the skew insensitive clock method, skew problems are avoided by providing a local feedback signal from one to another of each pair of transparent latches. The feedback signal for a phase of the clock is sent to a latch when an edge of the clock signal is received by the second latch in the pair, in order to ensure non-overlapping clock signals.

For clock signals which are distributed over the circuit, a race-free clocking scheme is guaranteed by the local feedback signals provided by the skew insensitive clocking method, regardless of the skew, because the SIC method eliminates the problem of hold constraint violations due to the clock skew. The SIC method transforms 2-sided constraints over skew implied by the satisfaction of setup and hold constraints into 1-sided constraints aimed at satisfying setup constraints and correct clock controller synchronization at every cycle. The skew insensitive clocking therefore provides a method of generating a race-free clock signal from a clock tree with non-zero skew. It improves design convergence, implementation robustness with respect to process parameter variations, and results in both power savings in the clock tree and reduction of noise and electro-magnetic interference.

Figure 1:
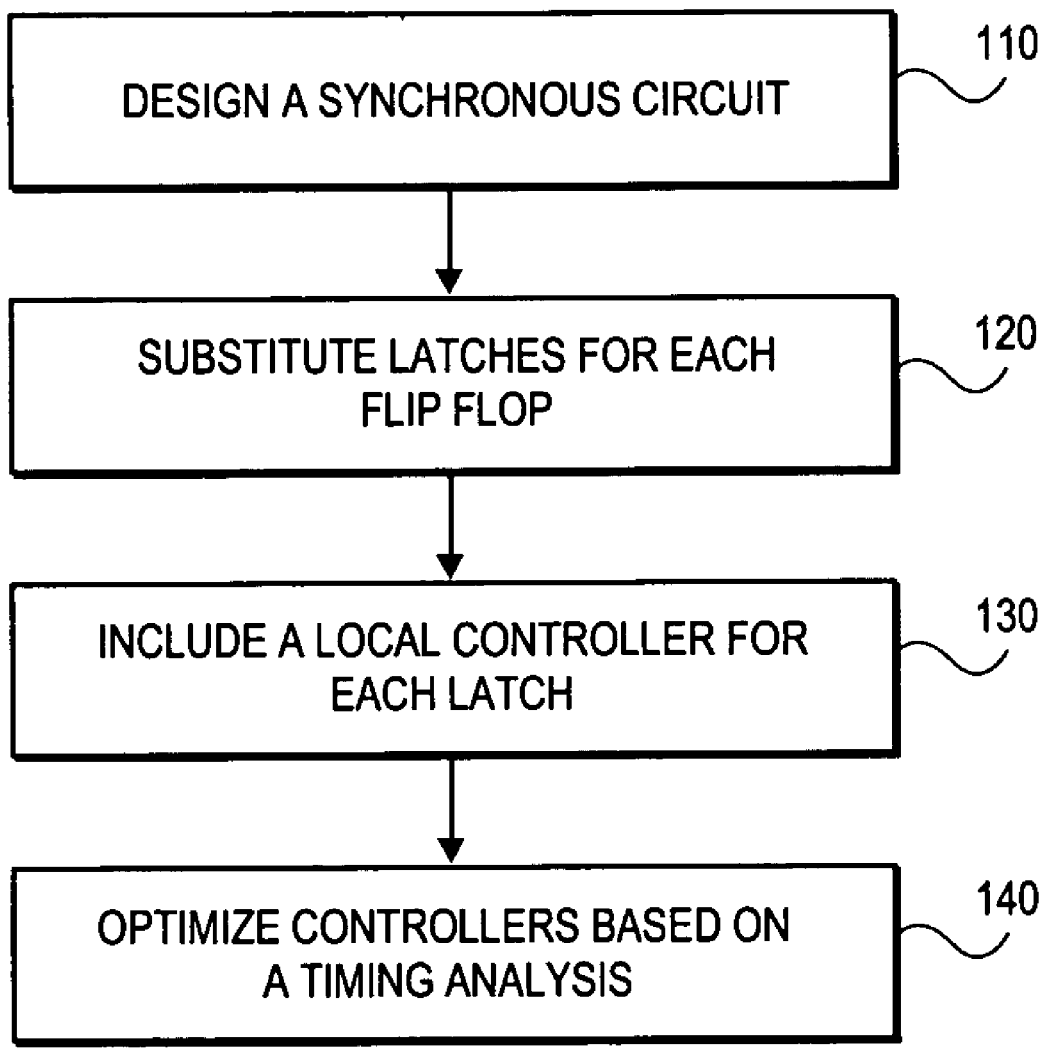
FIG. 1 shows an example of a method of designing a skew insensitive clocking circuit.

To design a circuit with SIC, the method shown in FIG. 1 is performed. A synchronous circuit with a single clock and memories, such as D-type flip-flops for example, is designed, 110. Two latches are substituted for each D-type flip-flop, 120. One of the latches is transparent with the high level of the clock, whereas the other is transparent with the low level. A local controller element is included in the design for each latch, between the clock signal and the control signal of the latch, 130.

A controller element is a sequential gate similar to a set-reset latch. Its output rises when all of its inputs rise, and its output falls when all of its inputs fall. For registers with a multiple fanout, acknowledges are collected from each fanout latch. For multiple clock signals, controllers that can multiply or divide frequencies of acknowledges are used. The controllers are optimized based on a timing analysis by removing inputs whose arrival time under a given timing margin fails to have an impact on the time of transitions at controller outputs, 140.

Figure 2:
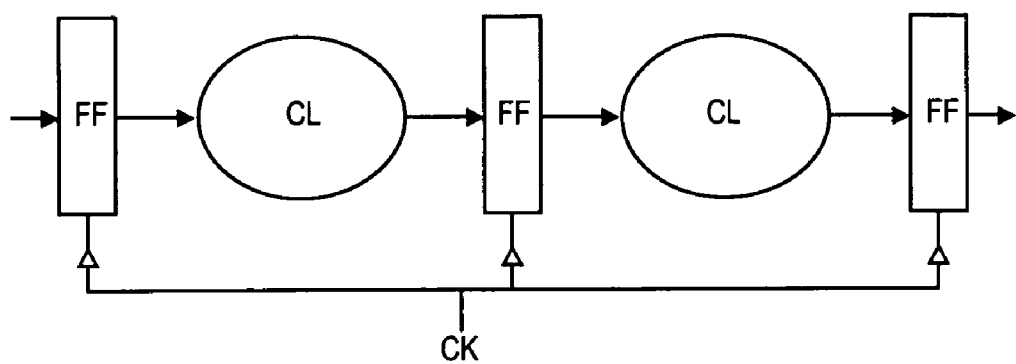
FIGS. 2, 3, 5 and 6 show examples of circuits designed during the method shown in FIG. 1.
Figure 3:
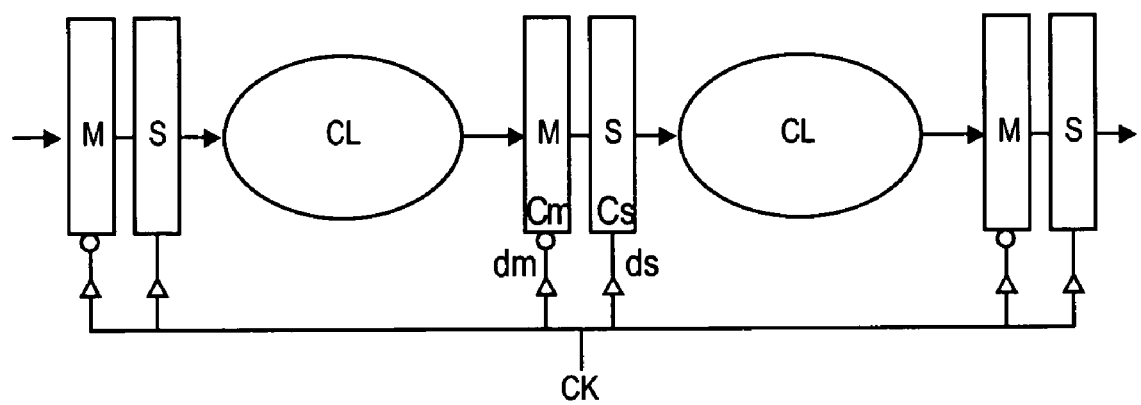
Figure 5:
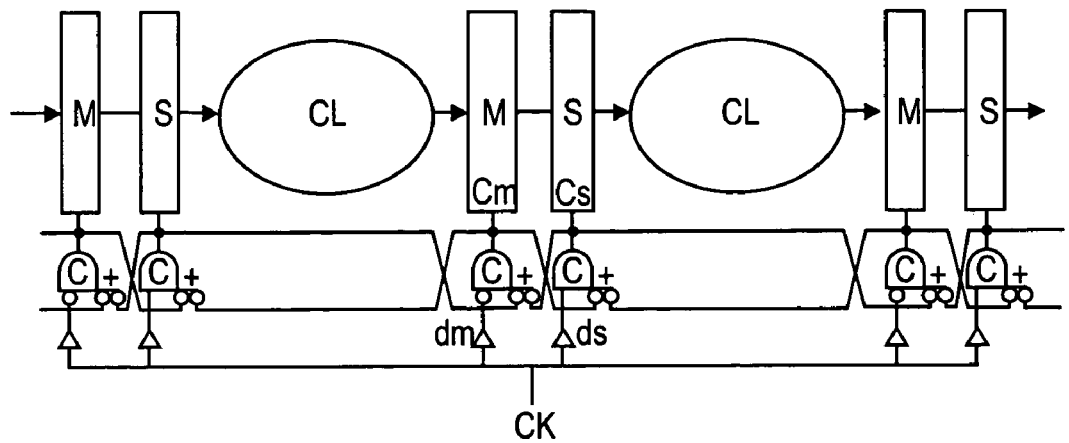

The circuit designs shown in FIGS. 2, 3, and 5 are created by performing the method of FIG. 1. (Although these Figures illustrate a linear pipeline design, the method can extend to an arbitrary netlist with a single clock). The synchronous circuit is designed, 110, with a single clock and memories, such as D-type flip-flops for example, as shown in FIG. 2. The circuit design is a synchronous pipeline with a global clock (CK), flip-flops (FF) and blocks of combinational logic (CL).

During the design method as shown in FIG. 1, two latches are substituted for each D-type flip-flop, 110, as shown in FIG. 3. Each flip-flop (FF) of FIG. 2 is composed of a pair of latches, including a master latch (M) and a slave latch (S), as shown in FIG. 3. In this example, the slave latches become transparent when the clock is high. Thus, the flip-flops read data on the rising edge of the clock. Also, the master latches are transparent when the clock is low. The flip-flops can therefore write data on the falling edge of the clock.

The buffers shown in FIG. 3 model the clock propagation delay. Signals dm and ds denote the delayed clock driving the master and slave latches, respectively. The clock signals arriving at the master and slave latches are called Cm and Cs, respectively. In the case of the master latches, the clock signal Cm is inverted with respect to the slave clock signal Cs, so that for each latch pair, one latch is open while the other is closed.

For example, for proper functioning of the system, adjacent latches, including those with combinational logic (CL) between them, are not transparent simultaneously. If the clock could propagate with zero delay, the phases would alternate and never overlap. However, variations in clock propagation may produce transient overlaps that could result in undesired data overruns due to the violation of the hold time constraint of a latch. This is known as the clock race problem, resulting from a clock skew. Avoiding it with zero skew is one of the main reasons for the high power consumption and slow design flow convergence of synchronous application specific integrated circuits (ASICs).

Figure 4:
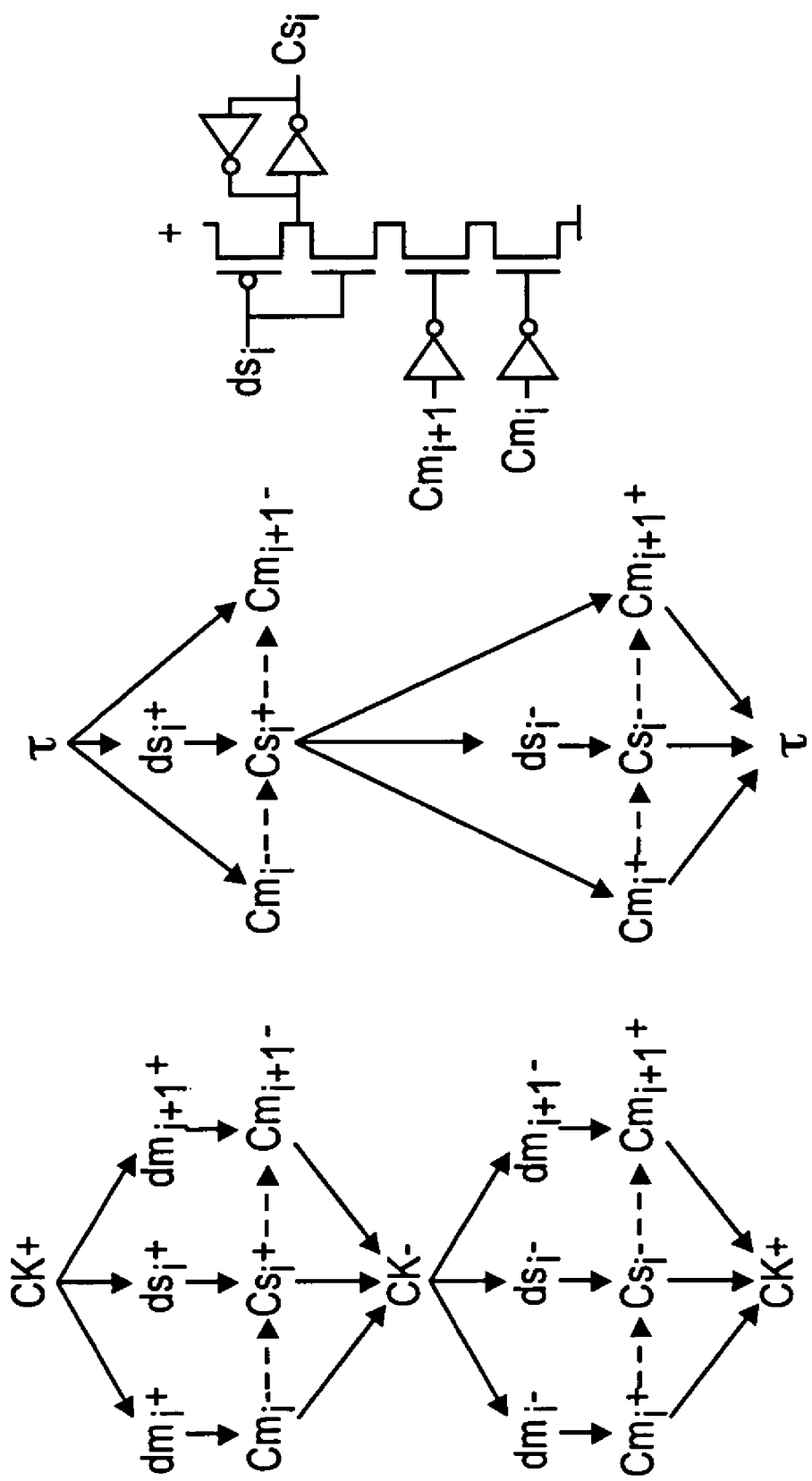
FIGS. 4(a) and 4(b) show examples of a behavior of a stage of a synchronous pipeline circuit before and after applying the method of FIG. 1.
FIG. 4(c) shows an example of a local controller using the skew-insensitive circuit design process as shown in FIG. 1.

FIG. 4(a) depicts a Signal Transition Graph (STG) modeling the behavior of the synchronous pipeline. The STG is a model that provides a formalization of signal waveforms used by designers to visualize circuit behavior. The STG describes the behavior by showing causal and timing relations between events of a system. Events are represented by rising (a+ e.g.) and falling (a− e.g.) transitions at gate outputs. Causal relations are shown by solid arcs, while timing constraints are represented by dashed arcs. In the STG of FIG. 4(a), the timing arcs specify constraints of two phase non-overlapping clocks. They indicate that no latch can be transparent simultaneously with any adjacent latch, on the left and right.

There are at least two different ways of ensuring these ordering constraints: by timing assumptions, and by causal relations. The former poses a physical design problem tightly related to the design of clock distribution networks. The latter requires re-designing the circuit in such a way that the ordering constraints are guaranteed by the logic. Standard non-overlapping clock generation techniques solve the problem using a mix of the two, by using a phase from the farthest latch from the driver (a timing assumption) as an acknowledge signal to generate the other phase (a causal relation). This can be done only after layout, and has potentially lower performance than the SIC technique, since the SIC method uses local, i.e. faster, acknowledge signals.

The SIC scheme solves these two problems simultaneously. The SIC method guarantees that the non-overlapping clock phases are generated by the logic of the circuit, without any physical requirement to ensure the correct temporal behavior. In this way, the hold constraints of each latch are automatically guaranteed by the design method. Second, the circuit tolerates clock skew in the clock network. Therefore, a lower power-demanding clock tree can be designed.

If the dashed arcs in FIG. 4(a) are transformed into causal arcs, the overlapping of clock phases can be avoided by the logic of the circuit. FIG. 4(b) depicts the projection of the behavior onto the relevant signals for the synthesis of Csi (a similar behavior corresponds to Cmi). A valid circuit implementation of the signal behavior is shown in FIG. 4(c). This implementation can be used to provide the controller elements (called C-elements) for the skew insensitive clock method.

During the design method as shown in FIG. 1, a local controller element C (such as the C-element shown in FIG. 4(c) for example) is added for each latch, 130, between the clock signal and the control signal of the latch, of the synchronous circuit design, as shown in FIG. 5. In practice, overlapping clock signals can be acceptable in the forward direction, since setup constraints can be satisfied by choosing a long enough period for the clock. Hence the synchronous circuit of FIG. 5 can be further optimized by performing a timing analysis, 140, during the method of FIG. 1, to produce the design as shown in FIG. 6.

Figure 6:
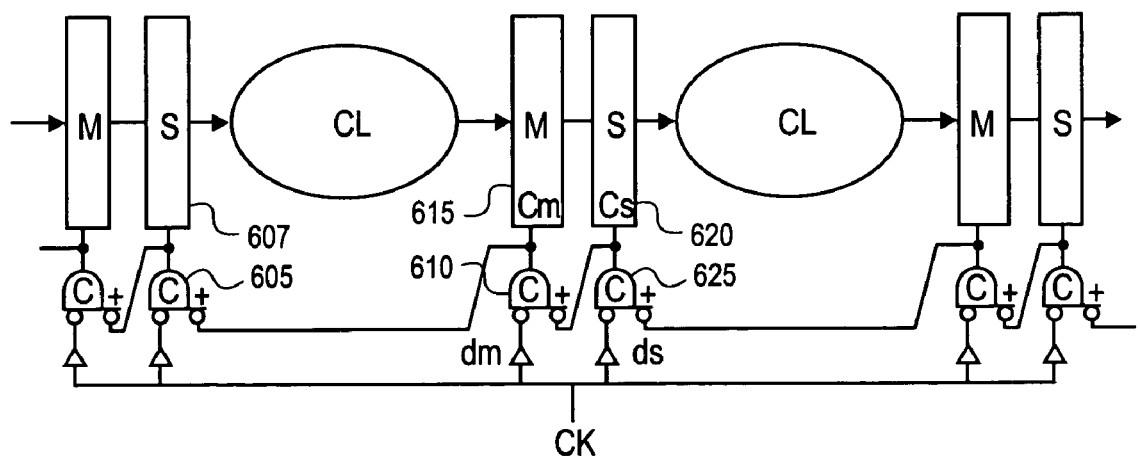

The skew insensitive clocking (SIC) method of FIG. 1 thus provides a way of designing the synchronous circuit of FIG. 6 that is insensitive to skewed clock signals. With the skew insensitive clock method, skew problems are avoided by providing a local feedback signal from one to another of each pair of transparent latches. The feedback signal for a phase of the clock is sent to a latch when an edge of the clock signal is received by the second latch in the pair, in order to ensure non-overlapping clock signals.

For example, the local controller element 610 of the master latch 615 is represented as a C-element that receives the inverted clock signal (CK) delayed by skew dm as one of its inputs. The other input to the local controller element 610 of the master latch 615 is an inversion of the clock signal Cs arriving at the adjacent slave latch 620 from controller 625. Thus, the controller 610 of the master latch 615 will output a high signal Cm when the clock signal (CK) (including skew dm) is low, and the feedback signal Cs from the output of controller 625 for adjacent slave latch 620 is low. The resulting non overlapping clock signal Cm that is sent from the controller 610 to the master latch 615 is high.

If the clock signal Cs that is input into slave latch 620 from controller 625 is high, then the clock signal Cm from controller 610 to master latch 615 will be low, regardless of whether the clock signal (CK) received by the input of master controller 610 is high or low. Therefore, the clock signal Cm from 610 to 615 and the clock signal Cs from controller 625 to latch 620 are not sent simultaneously. The clock signals Cm and Cs are non overlapping signals, regardless of whether a skew is present.

Similarly, the clock signal Cm of master latch 615 is used as a feedback signal to the input of controller 605 for slave latch 607. The feedback signal Cm is inverted at the input of controller 605. The clock signal Cs of slave latch 607 is high when the clock signal (including delay ds) received by controller 605 is high and the feedback signal Cm received by the controller 605 from master latch 615 is low. The clock signal Cs of slave latch 607 will be low when the clock signal Cm of master latch 615 is high, regardless of whether the clock signal (CK) received at the input of controller 605 is high or low.

The overhead in complexity of the design shown in FIG. 6 that implements the method of FIG. 1 is small: a C element for each latch or group of latches. An amount of clock wiring may be approximately the same as that for a single phase clock of synchronous circuit with FFs, because a pair of master-slave latches could be kept together, and their non-overlapping clocks derived locally, which is different from a conventional non-overlapped latch-based clocking scheme. In addition, the clock wiring for the method is less constrained than for a synchronous circuit with FFs due to the automatic satisfaction of hold constraints. Note, however that an implementation of controllers uses additional wiring between registers, but these wires are local and are likely to have a small impact to the total circuit area.

The comparison of the conventional synchronous FF-based implementation with the one provided by the SIC method is illustrated by the STGs in FIG. 7. From the STG for a FF-based circuit, one could derive the following setup and hold constraints:

$$T_{comb\_min} + T_{CLK\_Q} - T_{skew} \geq T_{hold} \quad (1)$$

$$T_{period} - T_{comb\_max} - T_{CLK\_Q} - T_{skew} \geq T_{setup} \quad (2)$$

where $T_{comb\_min}$, $T_{comb\_max}$ are the minimal and maximal delay of the combinational logic between flip-flops FF1 and FF2, $T_{CLK\_Q}$ is a propagation delay from clock pin to the output of a flip-flop, and $T_{skew}$, $T_{hold}$ and $T_{setup}$ are skew, hold and setup times.

For a latch-based design with race-free clocks the hold constraint is satisfied automatically by imposing causal relations between local clocks ($CS_i$ and $CM_{i+1}$) of adjacent latches. Setup constraints are defined by two paths in the STG from FIG. 6(b), and could be expressed as $$T_{period} - T_{comb\_max} - T_{CLK\_Q} - \max(T_{skew}, T_{controller}) \geq T_{setup} \quad (3)$$

where $T_{controller}$ is a delay of the local clock controller together with the acknowledging wire. Bearing in mind that the setup time for latches is close to 0, this embodiment of the SIC method has almost the same setup constraint as a FF-based approach. However, it does not have hold constraints, which can result in higher performance.

The synchronization approach in FIG. 6 has a number of advantages over the conventional approach. It can tolerate a longer skew in the clock tree, because hold constraints are ensured by causal relations rather than with timing assumptions. Thus, this SIC based approach achieves single-iteration clock buffering and routing convergence for non-performance-constrained designs, while using less clock power.

This is in contrast to traditional low-performance synchronous designs which still suffer from clock power and EMI problems, because the conventional design techniques require clock skews to be negligible with respect to gate delays. Hold violations in conventional designs can be fatal, no matter how slow the clock is. This means that the clock network in a conventional approach is carefully designed (and hence power-hungry) in current ASIC methodologies, not for improved cycle time performance, but for acceptable skew reduction. The local acknowledge signal provided by the skew insensitive clocking method, on the other hand, ensures that hold times are automatically met. Thus, the SIC method allows a designer to use a clock network with a relatively large skew, and hence low power and low EMI. This SIC based design does not suffer from functional correctness problems, and keeps the circuit elements in the design substantially synchronous.

As an additional benefit, the implementation in FIG. 6 has lower EMI and noise due to the inherent static jitter of the clock, stemming from both variation of delays in acknowledge wires and larger clock skews. Therefore, implementing the SIC method may be very useful for high skew circuits where a skew is inserted intentionally to satisfy noise regulations. For example, the SIC method may be used to improve the low-performance of 8-bit microcontrollers.

An extension of the skew insensitive clock approach can be applied to non-linear pipelines, as shown in FIG. 8(a), by adding C-elements as shown in FIG. 8(b). In non-linear pipelines, a controller collects acknowledge wires from each succeeding register. However, in the example as shown in FIG. 8(b), acknowledge signals that are not on the critical path have been eliminated without violating the correctness. This check could be done via a static timing analysis by analyzing the minimal delays of corresponding combinational logic (CL) clouds, which improves performance and reduces the logic complexity of the controller implementation. As a result of this optimization, C-elements could degenerate to buffers when there is a sufficient timing margin for hold constraints.

The skew insensitive clocking provides a method of generation of race-free clock from a clock tree with non-zero skew, a way to implement local controllers for generating race-free clocks, and a method to optimize local controllers based on static timing analysis. The SIC method eliminates the problem of hold constraint violations due to the clock skew. For clock signals which are distributed over the circuit, a race-free clocking scheme is guaranteed by the skew insensitive clocking, regardless of the skew.

The SIC method transforms 2-sided constraints over skew implied by the satisfaction of setup and hold constraints into 1-sided constraints aimed at satisfying setup constraints and correct clock controller synchronization at every cycle. It improves design convergence, implementation robustness with respect to process parameter variations, and results in both power savings in the clock tree and reduction of noise and electromagnetic interference.

The skew insensitive clocking does not require sophisticated layout and buffering techniques to reduce the skew of the clock signal in order to satisfy hold violations. The method also does not require an iterative timing analysis techniques to schedule operations under the awareness of the clock skew, but rather can use a single pass of timing analysis in order to compute the clock cycle time.

The buffering to propagate clock signals does not need to guarantee a specific delay to ensure correctness (hold times), but only to ensure performance (setup times). The skew insensitive clocking results in less demanding one-sided constraints, which translates into a design of a circuit that provides potentially higher performance and consumes a lower amount of area on an integrated circuit. Thus, clock networks can be less power consuming, and produce less electromagnetic interference and less noise.

We claim:

1. A computer-implemented method of implementing a synchronous circuit in an integrated circuit, comprising:

using a computer for:
　providing the synchronous circuit including flip-flops and combinatorial logic; and
　for a flip-flop in the synchronous circuit, inserting logic gates to receive a skewed clock signal and to locally derive non-overlapping clock phases from the skewed clock signal, wherein the act of inserting logic gates comprises replacing the flip-flop in the synchronous circuit with a pair of latches, including a master latch and a slave latch, wherein after the act of inserting logic gates, the synchronous circuit still functions synchronously; and
　implementing the synchronous circuit in the integrated circuit.

2. The method of claim 1, wherein inserting the logic gates to receive the skewed clock signal and to locally derive the non-overlapping clock phases comprises:
　providing a causal relation between the master latch and the slave latch to satisfy a hold constraint.

3. The method of claim 1, wherein the master latch is associated with an upstream slave latch and a downstream slave latch, wherein inserting the logic gates further comprises:
　for the master latch, adding a master latch local controller to receive the skewed clock signal that overlaps with a clock signal received by the upstream slave latch, to receive a feedback signal from the upstream slave latch, and to output a non-overlapping clock signal to the master latch.

4. The method of claim 3, further comprising:
　adding a slave latch local controller to the downstream slave latch to receive a feedback signal from the master latch, to receive a clock signal that overlaps with the master latch clock signal, and to output a non-overlapping clock signal to the downstream slave latch.

5. The method of claim 4, wherein the combinatorial logic is located between the master latch and the downstream slave latch.

6. The method of claim 1, further comprising:
　optimizing at least one of a master and a slave local controller based at least in part upon a timing analysis.

7. An apparatus for implementing a synchronous circuit in an integrated circuit, comprising:
　means for providing the synchronous circuit including flip-flops and combinatorial logic;
　means for inserting logic gates, for a flip-flop, to receive a skewed clock signal and to locally derive non-overlapping clock phases from the skewed clock signal, wherein means for inserting comprises means for replacing the flip-flop in the synchronous circuit with a pair of latches, including a master latch and a slave latch, wherein after inserting the logic gates, the synchronous circuit still functions synchronously; and
　means for implementing the synchronous circuit in the integrated circuit.

8. The apparatus of claim 7, wherein said means for inserting the logic gates to receive the skewed clock signal and to locally derive the non-overlapping clock phases comprises:
　means for providing a causal relation between the master latch and the slave latch to satisfy a hold constraint.

9. The apparatus of claim 8, wherein the master latch is associated with an upstream slave latch and a downstream slave latch, wherein said means for inserting the logic gates further comprises:
　means for adding a master latch local controller to the master latch to receive the skewed clock signal that overlaps with a clock signal of the upstream slave latch, to receive a feedback signal from the upstream slave latch, and to output a non-overlapping clock signal to the master latch.

10. The apparatus of claim 9, further comprising:
　means for adding a slave latch local controller to the downstream slave latch to receive a feedback signal from the master latch, to receive a clock signal that overlaps with the master latch clock signal, and to output a non-overlapping clock signal to the downstream slave latch.

11. The apparatus of claim 10, wherein the combinatorial logic is located between the master latch and the downstream slave latch.

12. The apparatus of claim 8, further comprising:
　means for optimizing at least one of a master and a slave local controller based at least in part upon a timing analysis.

13. An integrated circuit, comprising:
　a synchronous circuit, wherein the synchronous circuit comprises:
　a pair of latches and combinatorial logic, wherein the pair of latches is a replacement for a flip-flop, wherein the pair of latches comprises a master latch and a slave latch; and
　logic gates to receive a skewed clock signal and to locally derive non-overlapping clock phases for the master latch or the slave latch based at least in part the skewed clock signal, wherein the logic gates were inserted for the pair of latches in the synchronous circuit.

14. The circuit of claim 13, wherein the master latch and the slave latch have a causal relation between them to satisfy a hold constraint.

15. The circuit of claim 14, wherein the master latch is associated with an upstream slave latch and a downstream slave latch, wherein the logic gates further comprises:
　a master latch local controller for the master latch to receive the skewed clock signal that overlap with a clock signal of the upstream slave latch, to receive a feedback signal from the upstream slave latch, and to output a non-overlapping clock signal to the master latch.

16. The circuit of claim 15, further comprising:
　a slave latch local controller of the downstream slave latch to receive a feedback signal from the master latch, to receive a clock signal that overlaps with the master latch clock signal, and to output a non-overlapping clock signal to the downstream slave latch.

17. The apparatus of claim 16, wherein the combinatorial logic is located between the master latch and the downstream slave latch.

18. The circuit of claim 13, wherein at least one of a master and a slave local controller is optimized based at least in part upon a timing analysis.

* * * * *

UNITED STATES PATENT AND TRADEMARK OFFICE
CERTIFICATE OF CORRECTION

PATENT NO. : 7,634,749 B1  Page 1 of 1
APPLICATION NO. : 11/097514
DATED : December 15, 2009
INVENTOR(S) : Cortadella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Twenty-first Day of December, 2010

David J. Kappos
*Director of the United States Patent and Trademark Office*